United States Patent [19]

Hester et al.

[11] 4,138,078
[45] Feb. 6, 1979

[54] HELICOPTER CARGO HOOK APPARATUS
[75] Inventors: Michael L. Hester, Bedford; Francis E. Tiller, Arlington, both of Tex.
[73] Assignee: Textron Inc., Providence, R.I.
[21] Appl. No.: 801,859
[22] Filed: May 31, 1977
[51] Int. Cl.² .............................................. B64D 9/00
[52] U.S. Cl. ............................. 244/137 R; 294/83 R
[58] Field of Search ............... 244/137 R, 118 R, 127, 244/136, 115; 258/1.2, 1.4; 294/83 R; 239/171; 104/23 FS, 95

[56] References Cited
U.S. PATENT DOCUMENTS

| | | | |
|---|---|---|---|
| 2,364,042 | 12/1944 | Anderson | 258/1.2 |
| 2,433,136 | 12/1947 | Mancini | 258/1.2 |
| 2,471,544 | 5/1949 | Ring | 244/115 |
| 2,487,798 | 11/1949 | Griesinger et al. | 258/1.2 |
| 3,044,818 | 7/1962 | Tobey | 244/118 R X |
| 3,056,624 | 10/1962 | Nardone | 294/83 R |
| 3,369,796 | 2/1968 | Guin | 258/1.2 |
| 3,820,466 | 6/1974 | Allen | 104/95 |

Primary Examiner—Barry L. Kelmachter
Attorney, Agent, or Firm—Richards, Harris & Medlock

[57] ABSTRACT

An apparatus for attaching a load bearing line to a helicopter is disclosed that utilizes a curvilinear track mounted on the underside of the helicopter with a carriage having a cargo hook freely movable thereon. The curvilinear track has a radius of curvature that extends from the center of gravity of the helicopter to maintain forces imposed on the helicopter from a swinging load directed through a point near the center of gravity of the helicopter.

7 Claims, 5 Drawing Figures

HELICOPTER CARGO HOOK APPARATUS

BACKGROUND OF THE INVENTION

This invention relates to an apparatus for attaching a load bearing line to a helicopter. More particularly, the invention relates to an apparatus for attaching a load bearing line to a helicopter to substantially eliminate the imposition of destabilizing moments on the helicopter due to the side-to-side swinging of a cargo load supported by the helicopter.

Helicopters have been found useful in both military and civil applications. Among the many uses that helicopters may serve, the helicopter due to its hovering capability has been found particularly suitable for use as a crane for lifting various types of structures both on land and offshore. In other applications, because of its maneuverability, the helicopter has been utilized and lift and transport cargo from one location to another.

In order to utilize a helicopter as a flying crane or a cargo transporting vehicle, a cargo hook has been provided on the underside of the helicopter's fuselage for engaging a loop at the end of a cable connected to the load to be transported by the helicopter. To minimize the impact of the cargo hook installation on the structural design of the helicopter, the cargo hook is usually mounted rigidly to the underside of the helicopter. Thus, a load that is lifted by a helicopter at the end of a line that is connected to a helicopter by a rigidly mounted cargo hook will impose forces on the helicopter that pass through the point of attachment at the bottom of the fuselage.

It has heretofore been found, and it can readily be appreciated, that when a load that is being lifted by a helicopter in the aforementioned manner begins to swing from side to side that destabilizing moments will be created about the center of gravity of the helicopter. The creation of destabilizing moments makes the helicopter more difficult to control and may limit the amount of lead that can be safely lifted by the helicopter.

SUMMARY OF THE INVENTION

In accordance with the present invention a curvilinear track is mounted on the underside of the helicopter. A carriage means is freely movable in the track. A cargo hook depends from the carriage means for engaging the load bearing line. The track is arcuate with the center thereof at the center of gravity of the helicopter.

In its more specific aspects, the apparatus utilizes a curvilinear track which comprises an arcuate member forming a race, and carriage means which comprises a carriage frame having at least one roller wheel thereon that rolls in the race of the track.

In a more particular aspect of the invention, the curvilinear track comprises an arcuate I-beam member extending laterally of the fuselage of the helicopter to define first and second races on opposite sides of the web of the beam along the inner surfaces of one of the flanges of the beam. In accordance with this aspect of the invention, the carriage means comprises a carriage frame having first and second opposing roller wheel assemblies mounted thereon for rolling engagement within the race along the curvilinear track.

In a yet more specific aspect of the invention, the inner surfaces of the flange that form the first and second race incline outwardly and downwardly from the web of the I-beam. Accordingly, the roller wheel assemblies mounted on the carriage frame are canted at an angle corresponding to the inclination of the inner surfaces of the flange that forms the races.

Other aspects of this invention not outlined above will be covered in a detailed description of a particular embodiment that follows hereinafter.

BRIEF DESCRIPTION OF THE DRAWINGS

A more complete appreciation of the invention may be had by reference to the detailed description of a particular embodiment thereof which is presented below and is illustrated in the accompanying drawings, wherein.

DESCRIPTION OF A SPECIFIC EMBODIMENT

Figures 1A, 1B:
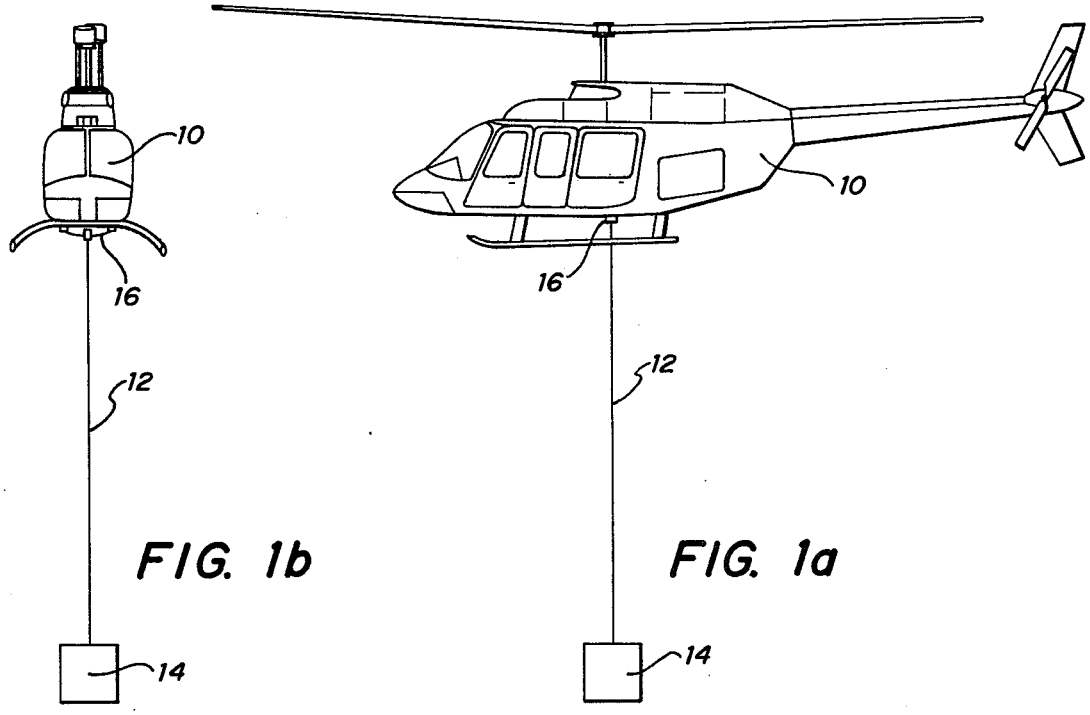
FIGS. 1A and 1B are side and frontal views, respectively, of a helicopter outfitted with the apparatus of the present invention and to which a load bearing line is attached.

Referring now to the drawings, and more particularly to FIGS. 1A and 1B thereof, a helicopter 10 has a load bearing line 12 depending therefrom which is connected to a load 14 that is to be lifted and transported by helicopter 10. Apparatus 16, which forms the subject of the present invention and is shown in greater detail in the remaining drawings, is provided for attaching load bearing line 12 to helicopter 10. As can be appreciated from the view of FIG. 1B, apparatus 16 for attaching load bearing line 12 to helicopter 10 extends transverse to the longitudinal axis of the helicopter.

Figure 2:
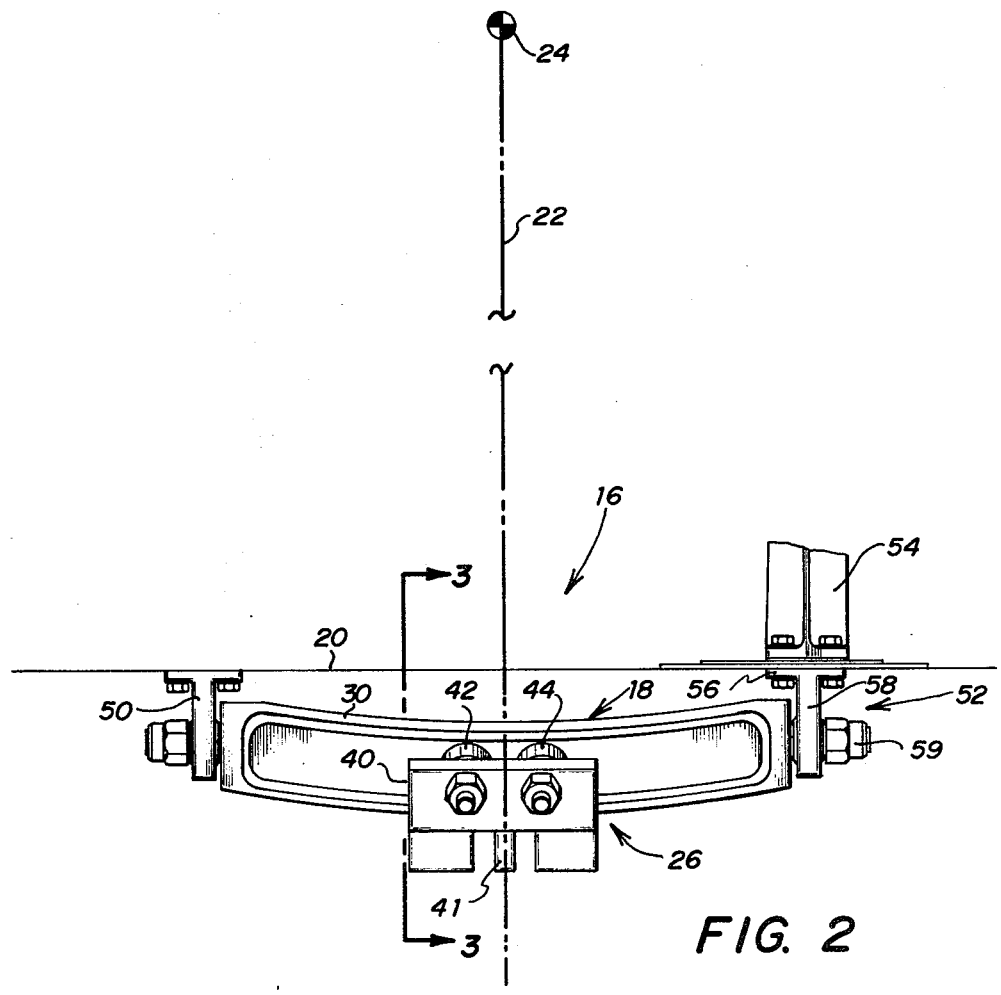
FIG. 2 is a detailed frontal view of one embodiment of the present invention showing the component parts of the apparatus of that embodiment.

The apparatus illustrated in FIG. 2 includes a curvilinear track 18 mounted on the underside, or bottom 20, of the helicopter. Track 18 has a radius of curvature 22 that extends from the center of gravity 24 of helicopter 10. Apparatus 16 further comprises carriage means 26 that is freely movable on track 18. A cargo hook 28, depending from carriage means 26 is further provided for engaging load bearing line 12 as will be hereinafter described in detail.

It will be appreciated that as carriage means 26 moves laterally along track 18 under the influence of a swinging load that the force imposed on the helicopter by the load will be directed through a point that is substantially coincident with the center of gravity of the helicopter.

Figure 4:
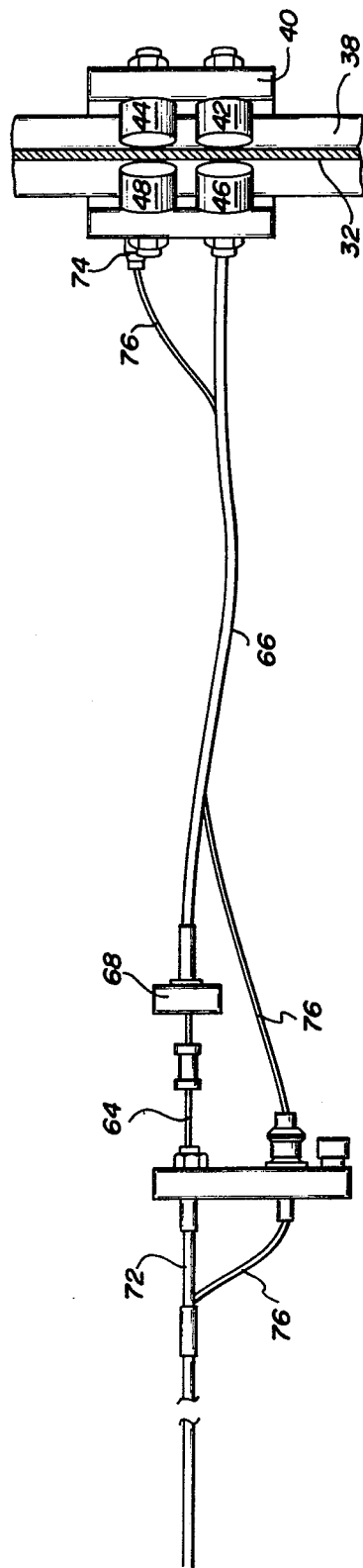
FIG. 4 is a plan view of the apparatus shown in FIG. 3.
Figure 3:
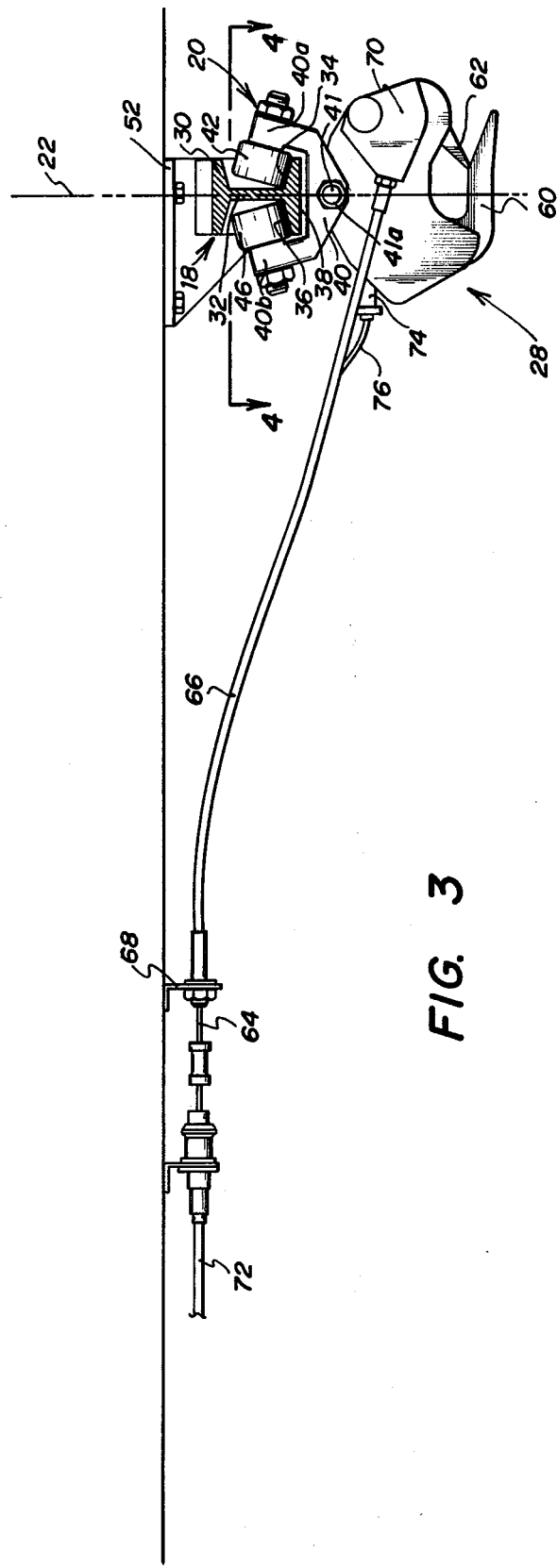
FIG. 3 is a cross-sectional view of the particular embodiment of the invention shown in FIG. 2 and further presenting the cargo hook and release mechanism therefor.

As shown in FIGS. 2–4, one suitable curvilinear track includes an arcuate I-beam 30 that extends laterally of the fuselage of the helicopter and defines first and second races on opposite sides of web 32 along the inner surfaces 34, 36 of flange 38. Suitable carriage means 26 for use with I-beam 30 includes a carriage frame 40 having opposing sets of roller wheel assemblies 42, 44, 46 and 48 mounted thereon for rolling engagement within the races defined by lower flange 38 of I-beam 30.

With particular reference to FIG. 2, in the embodiment shown, arcuate I-beam 30 forming curvilinear track 18 is attached to the underside of helicopter 10 at laterally spaced points by support brackets 50 and 52. As support brackets 50 and 52 are identical in design, only support bracket 52 will be described in detail. With attention being directed to support bracket 52, the bracket will be observed to be aligned with and secured to a structural bulkhead 54 in helicopter 10. Support bracket 52 comprises a base portion 56 that is secured to bulkhead 54 and from which a hanger portion 58 depends. To provide I-beam 30 with pivotal movement about an axis transverse to the longitudinal axis of the helicopter, hanger portion 58 of support bracket 52 is provided with a bearing (not shown) in which an axle 59 projecting outwardly from the end of I-beam 30 is journaled for rotational movement.

Referring now to the cross-sectional view of FIG. 3, it can be observed that the inner surfaces 34, 36 of flange 38 that form the first and second races of track 18 inclined outwardly and downwardly from web 32 of I-beam 30. Accordingly, roller wheel assemblies 42–48 are canted at an angle that corresponds to the inclination of the inner surfaces of flange 38. To provide the angular disposition of the roller wheel assemblies, carriage frame 40 takes on a generally V-shaped configuration in cross-section with the roller wheel assemblies being mounted on the upwardly and outwardly extending leg portions 40a and 40b thereof. The roller wheel assemblies are mounted for rotation about axes that are positioned perpendicular to the respective leg 40a or 40b.

At that lowermost portion of carriage frame 40 near the vertex formed by the intersection of leg portions 40a, 40b, there is provided a point of attachment for a conventional cargo hook 28. A bolt 41a at the point of attachment 41 defines a pivot point for cargo hook 28 with pivotal movement about an axis transverse to the helicopter. It will be noted from reference to FIG. 2 that attachment point 41 is positioned on carriage means 26 at a location intermediate its ends and coincident with a line that passes between roller assembly pairs 42, 46 and 44, 48 at equal distance from each pair such that the load acting on carriage means 26 will be equally distributed among roller assemblies 42–48. Accordingly, the bolt 41a at attachment point 41 for cargo hook 28 directs the force imposed on the hook by a load bearing line connected thereto along a line of action substantially coincident with the radius of curvature 22 of track 18.

Referring now to FIGS. 3 and 4, cargo hook 28 is shown to include a member 60 for engagement with a loop formed at the end of a load bearing cable and a pivoted keeper 62 for engagement with member 60 to maintain the looped end of the load bearing line detachable affixed on cargo hook 28. Keeper 62 is operably connected to a cable 64 that is actuated from within the cockpit of the helicopter to provide a manual release for cargo hook 28. Cable 64 is held within a guide tube 66 that is itself supported at its ends between a support bracket 68 affixed to the underside of the helicopter and a keeper pivot mechanism 70 contained within cargo hook 28. Cable 64 is further directed beyond support bracket 68 by an additional length of guide tube 72 which leads into the cockpit of the helicopter.

As an alternative to the manual release for cargo hook 28, a solenoid 74 is by in cargo hook 28. The solenoid 74 is operable to actuate pivoted keeper 62 in order to permit a load bearing line to be detached therefrom. A source of electrical current for energizing solenoid 74 is provided over electrical cable 76. Guide tube 66 that houses cable 64 also accommodates electrical cable 76 and guides it from cargo hook 28. Solenoid 74 can be operated by conventional electrical switches mounted in the cockpit of the helicopter. Further details of the components of the manual release and of the solenoid release, particularly the physical arrangement of each, can be had nby reference to FIG. 4.

The foregoing description of the invention has been directed to a particular embodiment thereof for purposes of explanation and illustration. It is therefore to be understood that, within the scope of the appended claims, the invention may be practiced otherwise than as specifically described without departing from the spirit and scope of the invention.

What is claimed is:

1. Apparatus for attaching a load bearing line to a helicopter, comprising:

a curvilinear track connected to fixed points on the underside of the helicopter and pivotable about a fixed axis which passes through each end of said curvilinear track and is transverse to the longitudinal axis of the helicopter, said curvilinear track having a radius of curvature extending from the center of gravity of the helicopter, carriage means freely movable on said track, and a cargo hook depending from said carriage means for engaging the load bearing line.

2. The apparatus of claim 1 wherein said cargo hook is pivotally attached to said carriage means for pivotal movement about an axis transverse to the longitudinal axis of the helicopter.

3. The apparatus of claim 1 wherein said curvilinear track comprises an arcuate member forming a race, and said carriage means comprises a carriage frame having at least one roller wheel assembly thereon that moves in the race of said track.

4. The apparatus of claim 1 wherein said curvilinear track comprises an arcuate I-beam having two substantially parallel flanges connected by a web, extending laterally of the fuselage of the helicopter and defining first and second races on opposite sides of the web along one of said flanges; and wherein said carriage means comprises a carriage frame having first and second opposing roller wheel assemblies mounted thereon for rolling engagement within the races of said track.

5. The apparatus of claim 4 wherein one of said flanges includes inner surfaces on opposite sides of the web inclined outwardly and downwardly from the web of said I-beam to form said first and second races; and wherein said roller wheel assemblies are canted at an angle corresponding to the inclination of the inner surface of said flange.

6. Apparatus for attaching a load bearing line to a helicopter, comprising:

an arcuate I-beam track having two substantially parallel flanges connected by a web, extending laterally of the fuselage of the helicopter and defining first and second races on opposite sides of the web along one of said flanges, said arcuate I-beam track having a radius of curvature extending from the center of gravity of the helicopter;

means to connect said arcute I-beam track to the underside of the fuselage of the helicopter at fixed pivot points for pivotal movement about a fixed axis transverse to the longitudinal axis of the helicopter, said fixed axis passing through each end of said I-beam track;

carriage means freely movable on said arcuate I-beam track comprising a carriage frame having first and second leg portions arranged on said frame to extend upwardly therefrom on opposite sides of said I-beam track and at least one roller wheel assembly mounted on each of said leg portions for rolling engagement within the races of said track; and a cargo hook pivotally attached to said carriage frame for releasably engaging the load bearing line.

7. The apparatus of claim 6 wherein one of said flanges, includes inner surfaces on opposite sides of the web inclined outwardly and downwardly from the web to form said first and second races; and wherein said roller wheel assemblies are mounted on said carriage frame at an angle corresponding to the inclination of the inner surfaces of said flange.

* * * * *

UNITED STATES PATENT AND TRADEMARK OFFICE
CERTIFICATE OF CORRECTION

PATENT NO. : 4,138,078
DATED : February 6, 1979
INVENTOR(S) : Michael L. Hester and Francis E. Tiller It is certified that error appears in the above-identified patent and that said Letters Patent are hereby corrected as shown below:

Column 3, lines 50 and 51, "detachable" should be
--detachably--.

Column 3, line 62, "by" should be --carried--.

Column 4, line 5, "nby" should be --by--.

Column 4, line 60, Claim 6, "arcute" should be
--arcuate--.

Signed and Sealed this

Twelfth Day of June 1979

[SEAL]

Attest:

RUTH C. MASON
Attesting Officer

DONALD W. BANNER
Commissioner of Patents and Trademarks